United States Patent [19]

Osuka

[11] Patent Number: 4,725,942
[45] Date of Patent: Feb. 16, 1988

[54] CONTROLLER FOR MULTIDEGREE OF FREEDOM NONLINEAR MECHANICAL SYSTEM

[75] Inventor: Koichi Osuka, Yokohama, Japan

[73] Assignee: Kabushiki Kaisha Toshiba, Kawasaki, Japan

[21] Appl. No.: 824,570

[22] Filed: Jan. 23, 1986

[30] Foreign Application Priority Data

Mar. 30, 1985 [JP] Japan .................................. 60-66942

[51] Int. Cl.$^4$ ........................ G05B 13/00; G06F 9/00
[52] U.S. Cl. .................................. 364/150; 364/162; 364/513; 901/45
[58] Field of Search .............. 364/150, 149, 151, 160, 364/161–163, 513; 318/561; 901/45

[56] References Cited

U.S. PATENT DOCUMENTS 3,876,871  4/1975  Sinner .................................. 364/151
4,156,835  5/1979  Whitney et al. .................... 364/149
4,458,321  7/1984  Whitney et al. .................... 318/561

OTHER PUBLICATIONS

A. Balestrino et al, "An Adaptive Model Following Control for Robotic Manipulators", Journal of Dynamic Systems, Measurement and Control, Sep. 1983, vol. 105, pp. 143–151.

H. Kawasaki, "Trajectory Control of Manipulators by On-Line Parameter Identification", Transactions of the Society of Instrument and Control Engineers; vol. 20, No. 9, 1984, pp. 8–15.

Primary Examiner—Jerry Smith
Assistant Examiner—Allen MacDonald
Attorney, Agent, or Firm—Schwartz, Jeffery, Schwaab, Mack, Blumenthal & Evans

[57] ABSTRACT

A controller for a multidegree of freedom nonlinear mechanical system is for applying an adaptive model following control to a nonlinear mechanical system with time-varying parameters which have multidegrees of freedom and a driving source for each of the degree of freedom, and is described by a differential equation of q-th degree.

24 Claims, 11 Drawing Figures

FIG. I
PRIOR ART
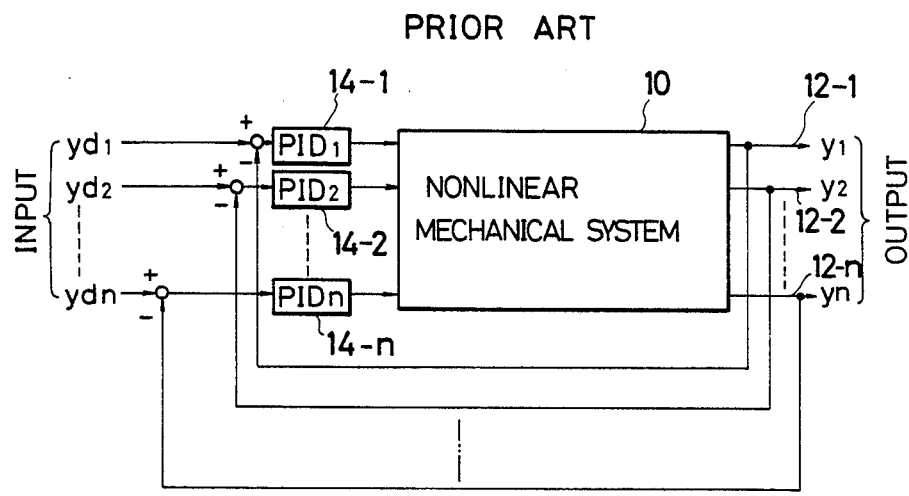
FIG. 2
PRIOR ART
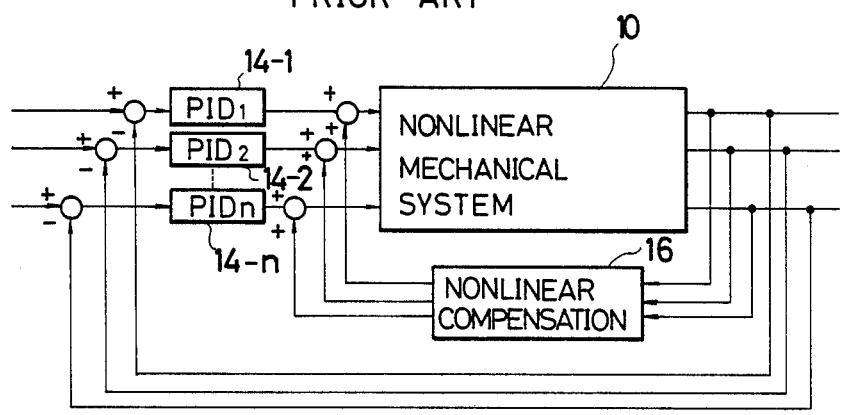

FIG. 4a $$\begin{bmatrix} I & 0 \\ 0 & J(x) \end{bmatrix} \begin{bmatrix} \dot{x}_1 \\ \dot{x}_2 \end{bmatrix} = \begin{bmatrix} x_2 \\ F(x) + u \end{bmatrix}$$

18

FIG. 4b $$\begin{bmatrix} \dot{x}_{M1} \\ \dot{x}_{M2} \end{bmatrix} = \begin{bmatrix} 0 & I \\ K_1 & K_2 \end{bmatrix} \begin{bmatrix} x_{M1} \\ x_{M2} \end{bmatrix} + \begin{bmatrix} 0 \\ I \end{bmatrix} U$$

22

FIG. 4c $$\hat{a}_0^{ii} = C_0^{ii} \int_0^t V_i(\tau)(k_{1i}x_{1i} + k_{2i}x_{2i} + U_i)d\tau + \hat{a}_0^{ii}(0)$$

$(1 \leq i \leq n)$ $$\hat{a}_k^{ij} = -C_k^{ij} \int_0^t [V_i(\tau) J_k^{ij}(x)\dot{x}_{2j} / J_0^{ii}(x)]d\tau + \hat{a}_k^{ij}(0)$$

$\left\{\begin{array}{l} j \neq i, 0 \leq k \leq m_{ij} \\ j = i, 1 \leq k \leq m_{ij} \end{array}\right\}$ $$\hat{b}_k^i = C_k^i \int_0^t [V_i(\tau) F_k^i(x) / J_0^{ii}(x)]d\tau + \hat{b}_k^i(0) \quad (1 \leq i \leq n)$$

$$V_i = d_i^T (X_{M1i} - X_{1i}, X_{M2i} - X_{2i})^T \quad (1 \leq i \leq n)$$

30

FIG.4d $$u_{Di} = \sum_{j=1}^{n} \left[ \sum_{k=\delta_{ij}}^{m_{ij}} \hat{a}_k^{ij} J_k^{ij}(x) \right] \dot{x}_{2j} \quad (1 \leq i \leq n)$$

$$\delta_{ij} = \begin{cases} 1 & \text{if } i = j \\ 0 & \text{if } i \neq j \end{cases}$$

32

FIG.4e $$u_{Ci} = -\sum_{k=1}^{p_i} \hat{b}_k^i F_k^i(x)$$
$$(1 \leq i \leq n)$$

34

FIG.4f $$G_i = \hat{a}_0^{ii} J_0^{ii}(x)$$
$$(1 \leq i \leq n)$$

36

FIG.4g $$u_{si} = k_{1i} x_{1i} - k_{2i} x_{2i}$$
$$(1 \leq i \leq n)$$

38

CONTROLLER FOR MULTIDEGREE OF FREEDOM NONLINEAR MECHANICAL SYSTEM

BACKGROUND OF THE INVENTION

1. Field of the Invention

The present invention relates to a controller for multidegree of freedom nonlinear mechanical system such as an articulated manipulator that can be described by a nonlinear equation of motion, in particular, to a controller which enables a control to be accomplished by carrying out nonlinear compensation in an adaptive manner.

2. Description of the Prior Art

As the systems for controlling a multidegree of freedom nonlinear mechanical system there are known exclusively the following two systems. In the first of the two which is shown in FIG. 1, a closed-loop control system is set up for each degree of freedom 12-1, 12-2, . . . , and 12-n, by completely neglecting the nonlinearity or the interference between the degrees of freedom of the multidegree of freedom nonlinear mechanical system 10. Then, the system is controlled linearly by inserting, for example, PID controllers 14-1, 14-2, . . . , and 14-n corresponding to respective closed loops.

In this system, however, it is difficult theoretically, too, to guarantee the stability of the system over the entire range of operation of the multidegree of freedom nonlinear mechanical system 10. That is, the operation of the system will become nonstable in the nonlinear region of operation, though it is stable in the neighborhood of the region of linear operation. In particular, when the mechanical system is put in a high-speed operation, there arises a problem that a deterioration in the control performance is inevitable due to the influences of the nonlinear forces and the interference between the degrees of freedom of the system.

Now, in the other system of control shown in FIG. 2, the parameters for the multidegree of freedom nonlinear mechanical system 10 are fixed to certain values by assuming that they are all known. Then, a nonlinear compensation is provided based on the results of computation of the nonlinear and interferential forces calculated at a nonlinear compensation unit 16 from the knowledge on the position and the velocity of the system.

However, according to this system, a difficulty exists in that all of the parameters for the multidegree of freedom nonlinear mechanical system 10 have to be known. Namely, among the parameters for the mechanical system there are included those that vary with position, velocity, and time such that it is practically impossible to identify them precisely. Therefore, when there occur errors and variations in the parameters, stability of operation by this system becomes also difficult to guarantee, leading to the problem that its control performance is aggravated excessively.

SUMMARY OF THE INVENTION

An object of the present invention is to provide a control device for a multidegree of freedom nonlinear mechanical system whose stability is guaranteed over the entire range of operation of the system.

Another object of the present invention is to provide a control device for a multidegree of freedom nonlinear mechanical system which is capable of adaptively determining the compensating input for compensating for the nonlinear terms in the equations of motion in accordance with the adaptation law that takes advantage of the characteristics of the mechanical system.

Another object of the present invention is to provide a control device for a multidegree of freedom nonlinear mechanical systems which is capable of automatically correcting the compensating input even when the parameters for the multidegree of freedom nonlinear mechanical system are unknown or time-varying.

In an adaptive model following control system for a nonlinear system with multidegrees of freedom that can be described by a differential equation of q-th degree and has driving sources for each degree of freedom, the present invention is characterized by the following. Namely, the device includes a model section which has a stored reference model with desired response characteristics, an adaptor which computes an adaptive signal based on the difference in the internal states of the mechanical system and the reference model, the input given to the control system, the signals for the position and the i-th derivative ($1 \leq i \leq q$) of the position of the mechanical system, and the nonlinear structure of the mechanical system, a nonlinear force computation section which computes an input for canceling the nonlinear forces other than the inertial force of the mechanical system, based on the signal output from the adaptor, the position and the i-th derivatives ($1 \leq i \leq q$) of the position of the mechanical system, and the nonlinear structure of the mechanical system, a noninterference computation section which computes an input for canceling the interferential forces between the degrees of freedom of the mechanical system that is contained in the intertial force, and an inertial term gain computation section which computes a nonlinear compensating gain of the inertial term. With a construction described in the above, it aims at bringing the output of the mechanical system and the output of the referrence model to a coincidence in the course of the time.

These and other objects, features and advantages of the present invention will be more apparent from the following description of the preferred embodiments, taken in conjunction with the accompanying drawings.

BRIEF DESCRIPTION OF THE DRAWINGS

FIG. 1 is a block diagram for an example of a prior controller for multidegree of freedom nonlinear mechanical system;

FIG. 2 is a block diagram of another example of a prior controller for multidegree of freedom nonlinear mechanical system;

FIGS. 4a–4g are the block diagrams for illustrating the details of computation at the nonlinear mechanical system, the reference model section, the adaptor, the noninterference computation section, the nonlinear force computation section, the inertial term gain computation section, and the stabilizer that are shown in FIG. 3.

DESCRIPTION OF THE PREFERRED EMBODIMENTS

Figure 3:
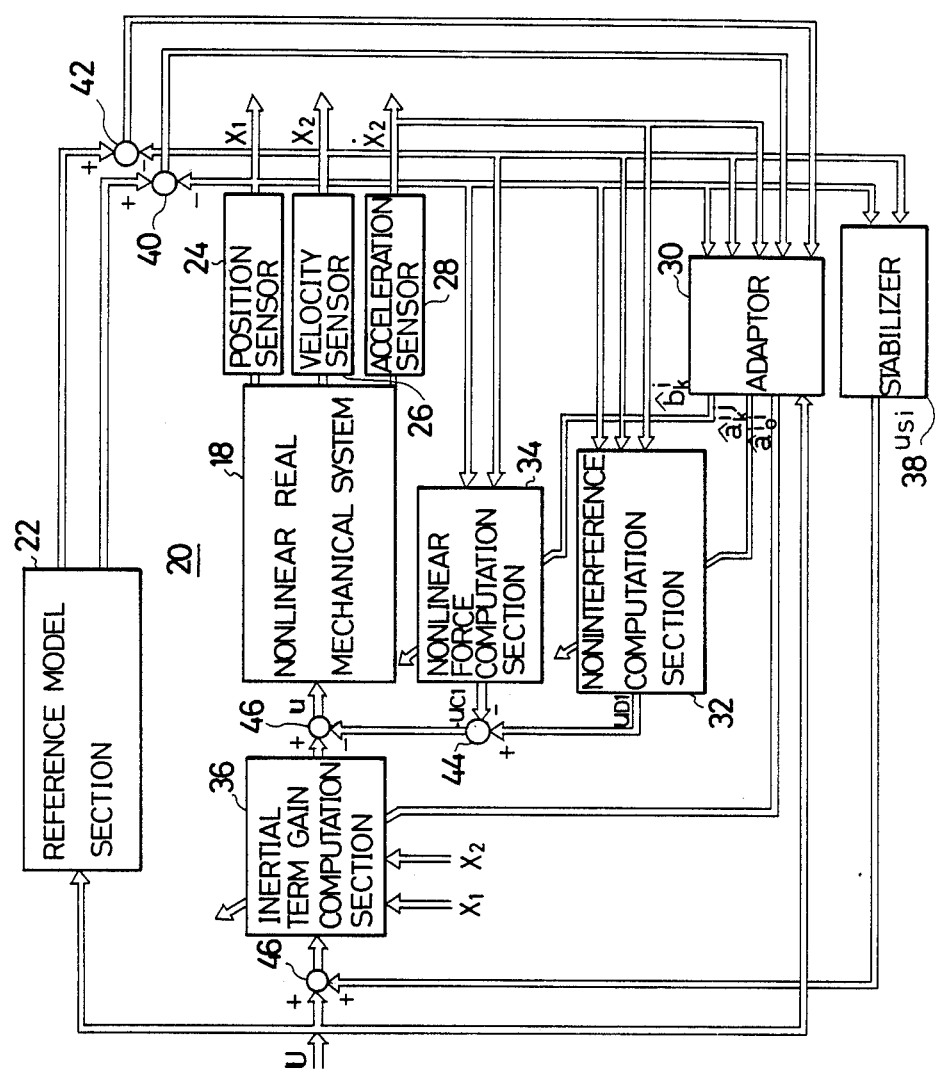
FIG. 3 is a block diagram for a controller for multidegree of freedom nonlinear mechanical system embodying the present invention.

Referring to FIG. 3, there is shown a controller for controlling a multidegree of freedom nonlinear mechanical system 18 by adaptively following the model, with reference numeral 20. The controller for multidegree of freedom nonlinear mechanical system 20 includes a reference model section 22 which has a stable built-in reference model that is determined by the designer of the control system, a position sensor 24, a velocity sensor 26, and an acceleration sensor 28 which detect the position $x_1$, velocity $x_2$, and acceleration $\dot{x}_2$, respectively, for each degree of freedom of the real mechanical system 18, an adaptor 30 which computes the various kinds of time-varying parameters of the mechanical system for determining nonlinear compensating input, a noninterference computation section 32 which computes a compensating input $U_{Di}$ for canceling the interferential forces in the inertial term of the real mechanical system 18, a nonlinear force computation section 34 which computes an input $U_{Ci}$ for canceling nonlinear forces other than the inertial force is the real mechanical system 18, an inertial term gain computation section 36 which computes a gain $G_i$ for compensating for the variations in the value of the inertial term due to nonlinearity, and a stabilizer 38 which computes a stabilizing input $U_{Si}$ for the real mechanical system 18.

The adaptor 30 determines the time-varying parameters $\hat{a}_o^{ij}$, $\hat{a}_k^{ij}$, and $\hat{b}_k^{i}$ for the real mechanical system 18 based on the difference signals for the internal states between the mechanical system 18 and the reference model, an input signal U applied to the control system, and the position signal $x_1$, the velocity signal $x_2$, and the acceleration signal $\dot{x}_s$ that are input, in order to output the results to the noninterference computation section 32, the nonlinear force computation section 34, and the inertial term gain computation section 36. The noninterference computation section 32 receives the position signal $x_1$, the velocity signal $x_2$, and the acceleration signal $\dot{x}_2$, as well as the setlled parameters $\hat{a}_k^{ij}$ from the adaptor 30, and outputs a compensating input $u_{Di}$ that takes the parameter variations in the real mechanical system 18 into account, for canceling the interferential forces between the degrees of freedom of the real mechanical system 18. The nonlinear force computation section 34 receives the position signal $x_1$, the velocity signal $x_2$, and the acceleration signal $\dot{x}_2$, as well as the settled parameters $\hat{b}_k^{i}$ from the adaptor 30, and outputs an input $u_{Ci}$ that takes the parameters variations in the real mechanical system 18 into accout, for canceling the nonlinear forces other than the inertial force of the real mechanical system 18. The inertial term gain computation section 36 receives the position signal $x_1$ and the velocity signal $x_2$, as well as the settled parameters $\hat{a}_o^{ii}$ to compute a gain $G_i$ for compensating for the variations in the value of the inertial force due to nonlinearity, and outputs the product of the input signal $U_i + u_{Si}$ and the gain. The output $u_{Ci}$ of the nonlinear force computation section 34 is subtracted from the output $u_{Di}$ of the noninterference computation section 32, the result of which is added to the output signal $G_i(U_i + u_{Si})$ from the inertial term gain computation section 36 to be input to the real mechanical system 18. Namely, in the above controller, even when there occur paremeter variations, the system can be controlled by computing the new parameters at the adaptor 30 so that it is possible to accomplish a very stable control that takes the parameter variations into account. Therefore, the controller will be more effective when it is applied to a real nonlinear mechanical system with multidegrees of freedom in which parameter variation may occur as in the above embodiment.

Next, concrete operation of each element of the controller will be described.

The real mechanical system 18 has a driving source for each degree of freedom, and its operation can be represented by the following equation of motion as shown also in FIG. 4a.

$$\begin{pmatrix} I & O \\ O & J(x) \end{pmatrix} \begin{pmatrix} \dot{x}_1 \\ \dot{x}_2 \end{pmatrix} = \begin{pmatrix} x_2 \\ F(x) + u \end{pmatrix}. \tag{1}$$

In Eq. (1), $x^T \triangleq (x_1^T, x_2^T) = (x_{11}, \ldots, X_{1n}, x_{21}, \ldots, X_{2n})$, where $x_1$ and $x_2$ represent the position and the velocity, respectively. Further, $J(x)$ and $F(x)$ are respectively nxn and nxl matrices that may be represented by the following equations.

$$J(x) = \begin{bmatrix} \sum_{k=0}^{m_{ll}} a_k^{ll} J_k^{ll}(x), \ldots, \sum_{k=0}^{m_{ln}} a_k^{ln} J_k^{ln}(x) \\ \sum_{k=0}^{m_{nl}} a_k^{nl} J_k^{nl}(x), \ldots, \sum_{k=0}^{m_{nn}} a_k^{nn} J_k^{nn}(x) \end{bmatrix}, \tag{2}$$

$$F(x) = \begin{bmatrix} \sum_{K=1}^{P_l} b_k^l F_k^l(x) \\ \sum_{k=1}^{P_n} b_k^n F_k^n(x) \end{bmatrix}.$$

Here, $a_o^{ij}, \ldots, a_{mij}^{ij}$; $b_1^i, \ldots, b_{Pi}^i$ ($1 \leq i, j \leq n$) are unknown or time-varying parameters, and $J_o^{ij}(x), \ldots, J_{mij}^{ij}(x)$; $F_1^i(x), \ldots, F_{Pi}^i(x)$ ($1 \leq i, j \leq n$) are nonlinear bounded known functions that do not contain unknown parameters. u represents an $n \times 1$ input vector which is applied to the real mechanical system 18, and O and I represent $n \times n$ zero matrix and unit matrix, respectively. Further, there hold the relations $a_o^{ii} J_o^{ii}(x) \neq 0$ and $a_o^{ii} > 0$ for arbitrary i and x on physical grounds.

Next, the reference model section 22 includes a reference model which is represented by the following equation.

$$\begin{bmatrix} \dot{x}_{M1} \\ \dot{x}_{M2} \end{bmatrix} = \begin{bmatrix} O & I \\ K_1 & K_2 \end{bmatrix} \begin{bmatrix} x_{M1} \\ x_{M2} \end{bmatrix} + \begin{bmatrix} O \\ I \end{bmatrix} U. \tag{3}$$

In the above equation, $X_M^T = (X_{M1}^T X_{M2}^T) = (X_{M11}, \ldots, X_{M1n}, X_{M21}, \ldots, X_{M2n})$, and U is a new vector input that will be applied to the controller after the construction of the control system. Further, $K_1$ and $K_2$ are matrices that are selected to make the reference model stable that may be represented, for instance, by $K_1 = \text{diag} [k_{11}, \ldots, K_{1n}]$ and $K_2 = \text{diag} [k_{21}, \ldots, k_{2n}]$. It is to be noted that in the present controller, the response of the real mechanical system 18 is arranged to coincide with the response of the reference model 22.

The adaptor 30 carries out the computation of the parameters for the real mechanical system 18 according to the following expressions, by using the position signal $x_1$, the velocity signal $x_2$, and the acceleration signal $\dot{x}_2$ for each degree of freedom that are detected by the position sensor 24, the velocity sensor 26, and the acceleration sensor 28, respectively, the position deviation signal and the velocity deviation signal for each degree of freedom between the reference model 22 and the real mechanical system 18 that are detected by the subtractors 40 and 42, the above-mentioned nonlinear functions $J_o^{ij}(x), \ldots, J_{mij}^{ij}(x); F_1^i(x), \ldots, F_{Pi}^i(x)$ ($1 \leq i, j \leq n$), the matrices $K_1$ and $K_2$, and the input signal U.

$$\hat{a}_o^{ii} = C_o^{ii} \int_0^t V_i(\tau)[k_{1i}x_{1i} + K_{2i}x_{2i} + U_i]d\tau + \hat{a}_o^{ii}(0), \ (1 \leq i \leq n) \quad (4)$$

$$\hat{a}_k^{ij} = -C_k^{ij} \int_0^t [V_i(\tau)J_k^{ij}(x)\dot{x}_{2j}/J_o^{ii}(x)]d\tau + \hat{a}_k^{ij}(0), \quad (5)$$

$$\begin{pmatrix} j \neq i, 0 \leq k \leq m_{ij} \\ j = i, 1 \leq k \leq m_{ij} \end{pmatrix}$$

$$\hat{b}_k^i = C_k^i \int_0^t [V_i(\tau)F_k^i(x)/J_0^{ii}(x)]d\tau + \hat{b}_k^i(0), \ (1 \leq i \leq n) \quad (6)$$

$$V_i = d_i^T(x_{M1i} - x_{1i}, x_{M2i} - x_{2i})^T, \ (1 \leq i \leq n) \quad (7)$$

In the above equations, the constants $\hat{a}_o^{ii}(0)$, $\hat{a}_k^{ij}(0)$, and $\hat{b}_k^i(0)$ may be given arbitrary values. Moreover, it is assumed that $C_k ij > 0$ and $C_k^i > 0$, and a $2 \times 1$ vector $d_i$ is chosen so as to make the transfer function $W_i(s) = d_i^T(sI - A_{Mi})^{-1} b_i$ strictly positive real, where the relevant matrices are defined as below.

$$A_{Mi} = \begin{bmatrix} 0 & 1 \\ k_{1i} & k_{2i} \end{bmatrix}, b_i = \begin{bmatrix} 0 \\ 1 \end{bmatrix}, I = \begin{bmatrix} 1 & 0 \\ 0 & 1 \end{bmatrix}. \quad (8)$$

The noninterference computation section 32 computes the compensating input $u_{Di}$ which cancels the interferential forces in the inertial term of the real mechanical system 18. Namely, the noninterference computation section 32 computes the following input by using the position signal $x_1$, the velocity signal $x_2$, and the acceleration signal $\dot{x}_2$ that are detected by the sensors 24, 26, and 28, respectively, the above-mentioned nonlinear functions $J_k^{ij}(x)$ (excluding $J_o^{ij}(x)$), and the parameters $\hat{a}_k^{ij}$ (excluding $\hat{a}_o^{ii}$) that are determined by the adaptor 30.

$$u_{Di} = \sum_{j=1}^n \left[ \sum_{k=\delta_{ij}}^{m_{ij}} \hat{a}_k^{ij} J_k^{ij}(x) \right] \dot{x}_{2j}, \ (1 \leq i \leq n) \quad (9)$$

where it is set that $$\delta_{ij} = \begin{cases} 1 & \text{if } i = j \\ 0 & \text{if } i \neq j \end{cases}$$

The nonlinear force computation section 34 computes the input $u_{Ci}$ which cancels the nonlinear forces other than the inertial force of the real mechanical system 18. Namely, the nonlinear force computation section 34 computes a part of the compensating input, $U_{Ci}$, shown below by using the position signal $x_1$ and the velocity signal $x_2$ that are detected by the sensors 24 and 26, respectively, the nonlinear functions $F_k^i(x)$, and the parameters $\hat{b}_k^i$ that are determined by the adaptor 30.

$$u_{Ci} = - \sum_{k=1}^{P_i} \hat{b}_k^i F_k^i(x), \ (1 \leq i \leq n). \quad (10)$$

Then, the output $u_{Ci}$ of the nonlinear force computation section 34 is subtracted from the output $u_{Di}$ of the non-interference computation section 32 in a subtractor 44.

The inertial term gain computation section 36 computes the gain $G_i$ for compensating for the variations in the inertial term due to nonlinearity. Namely, the computation section 36 computes a gain given below by using the position signal $x_1$ and the velocity signal $x_2$ that are detected by the sensors 24 and 26, respectively, the nonlinear functions $J_o^{ii}(x)$, and the parameters $\hat{a}_o^{ii}$ that are determined by the adaptor 30.

$$G_i = \hat{a}_o^{ii} J_o^{ii}(x), \ (1 \leq i \leq n). \quad (11)$$

The output $G_i$ of the inertial term gain computation section 36 and the output of the subtractor 44 are introduced to an adder 46 whose output u is given to the real mechanical system 18 as an input.

The stabilizer 38 computes a stabilizing input $u_{Si}$ for the real mechanical system 18. Namely, the stabilizer 38 computes an input $u_{Si}$ given below by using the position signal $x_1$ and the velocity signal $x_2$ that are detected by the sensors 24 and 26, respectively, and the matrices $K_1$ and $K_2$.

$$u_{Si} = k_{1i}x_{1i} + k_{2i}x_{2i}, \ (1 \leq i \leq n). \quad (12)$$

Then, the output of the stabilizer 38 is introduced to an adder 46 together with the input U, and the output of the adder 46 is input to the inertial term gain computation section 36.

In a controller for multidegree of freedom nonlinear mechanical system constructed as in the foregoing, the position and the velocity of the real mechanical system tend to coincide in the course of the time with the position and the velocity of the reference model, so that there will be accomplished effects that have been mentioned earlier.

Figure 5:
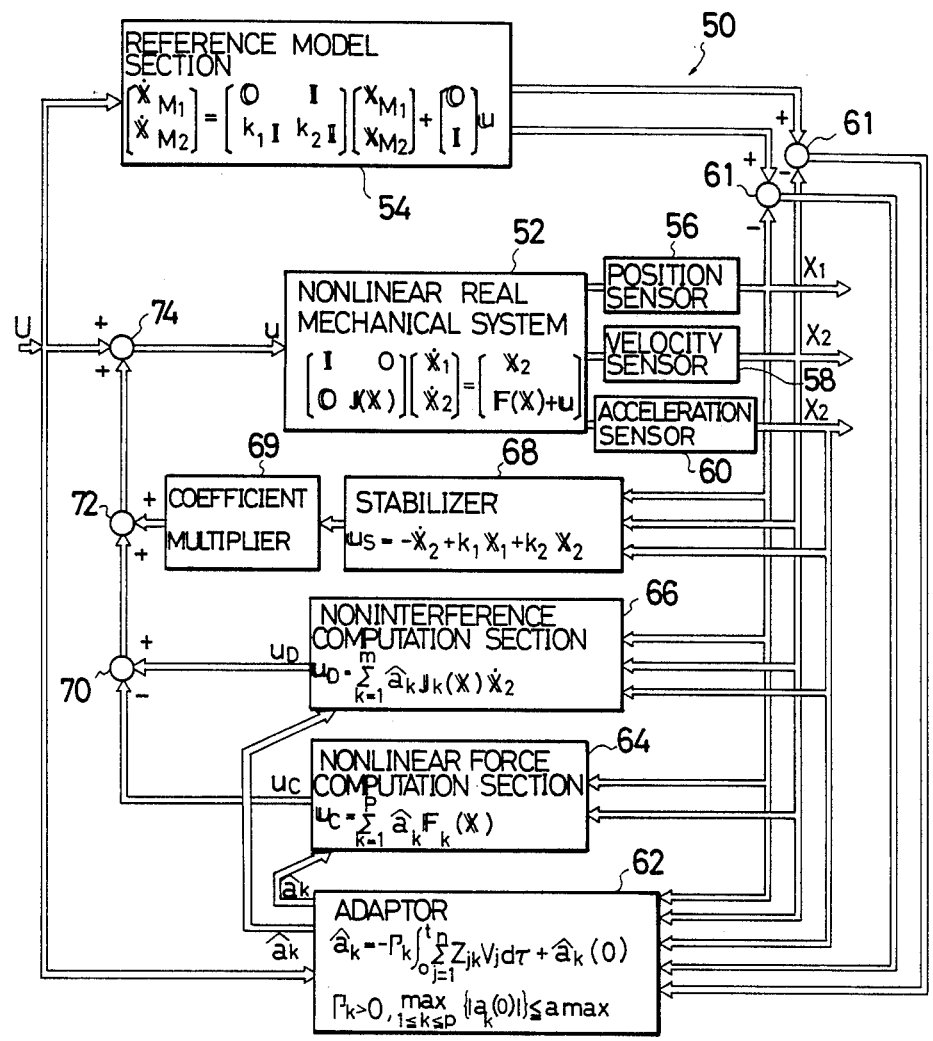
FIG. 5 is a block diagram for another embodiment of the controller for multi degree of freedom nonlinear mechanical system in accordance with the present invention.

Next, referring to FIG. 5, another embodiment of the controller for multidegree of freedom nonlinear mechanical system that is in accordance with the present invention is shown with reference numeral 50.

The controller 50 is for controlling a multidegree of freedom nonlinear mechanical system 52 by adaptively following the model. The controller 50 includes the reference model section 54 which has a built-in stable reference model that is determined by the designer of the control system, a position sensor 56, a velocity sensor 58, and an acceleration sensor 60 which detect the position signal $x_1$, the velocity signal $x_2$, and the acceleration signal $\dot{x}_2$, respectively, for each degree of freedom of the real mechanical system 52, an adaptor 62 which computes the various time-varying parameters of the real mechanical system 52 for determining the nonlinear compensating inputs, a nonlinear force computation section 64 which computes an input $u_C$ for canceling the nonlinear forces other than the inertial force of the real mechanical system 52, a noninterference computation section 66 which computes a compensating input $u_D$ for canceling the interferential forces in the inertial term, as well as for compensating for the variations in the value of the inertial term, of the real mechanical system 52, a stabilizer 68 which computes a stabilizing input $u_S$ for the real mechanical system 52, and a coefficient multiplier 69 which multiplies the stabilizing input $u_S$ by a coefficient. It should be noted in the present embodiment that the noninterference computation section 66 possesses also a function of computing an input for compensating for the variations in the value of the inertial term due to nonlinearity, so that it becomes possible to do away with a special inertial term gain computation section. Therefore, the circuit construction can be simplified accordingly.

The adaptor 62 receives the difference signals between the internal states of the mechanical system 52 and the reference model 54, an input signal that is applied to the control system, and the position signal $x_1$, the velocity signal $x_2$, and the acceleration signal $\dot{x}_2$, to determine the time-varying parameters $\hat{a}_k$ of the real mechanical system 52, and outputs the result to the noninterference computation section 66 and the nonlinear force computation section 64. The noninterference computation section 66 receives the settled parameters $\hat{a}_k$ from the adaptor 62, and the position signal $x_1$, the velocity signal $x_2$, and the acceleration signal $\dot{x}_2$, to compute and output a compensating input $u_D$ for canceling the interferential forces between the degrees of freedom of the real mechanical system 52 that takes the parameter variations of the real mechanical system 52 into account, as well as for compensating for the variations in the value of the inertial term due to nonlinearity. The nonlinear force computation section 64 receives the settled parameters $\hat{a}_k$ from the adaptor 62 and the position signal $x_1$, the velocity signal $x_2$, and the acceleration signal $\dot{x}_2$, to compute and output an input $u_C$ for canceling nonlinear forces other than the inertial force of the real mechanical system 52 that takes the parameter variations of the real mechanical system 52 into account. The stabilizer 68 receives the position signal $x_1$, the velocity signal $x_2$, and the acceleration signal $\dot{x}_2$, to compute and output a stabilizing input $u_S$. The coefficient multiplier 69 multiplies the stabilizing input $u_S$ by a coefficient $\lambda$. Then the output $U_C$ of the nonlinear force computation section 64 is subtracted from the output $u_D$ of the noninterference computation section 66. The result of the subtraction is added to the output of the coefficient multiplier 69 which is the product of the output $u_S$ of the stabilizer 68 and the coefficient $\lambda$, and the sum is added to the input U which is given to the control system. The result of the sum is then input to the real mechanical system 52 as an input u. Therefore, it should be noted also in the present controller that even when the parameters of the system vary, control of the system can be made by computing the parameters at the adaptor 62, accomplishing a stabilized control that takes the parameter variations into account As a consequence, analogous to the previous embodiment, the present controller can achieve significant effects when it is applied to a multidegree of freedom nonlinear mechanical system that may have parameter variations.

Next, concrete operation of each element in the second embodiment of the present invention will be described.

The real mechanical system 52 shown in FIG. 5 possesses a driving source for each degree of freedom, and can be represented by the following equation of motion.

$$\begin{bmatrix} I & O \\ O & J(x) \end{bmatrix} \begin{bmatrix} \dot{x}_1 \\ \dot{x}_2 \end{bmatrix} = \begin{bmatrix} x_2 \\ F(x) + u \end{bmatrix}. \quad (1)$$

In the above equation, $J(x)$ and $F(x)$ are matrices that are nonlinear in x but are linear in the parameters. Moreover, it will be assumed that there exist interdependent relationship among the parameters. Namely, the following forms will be assumed for the above functions.

$$J(x) = \sum_{k=1}^{m} a_k J_k(x), \quad (13)$$

$$F(x) = \sum_{k=1}^{P} a_k F_k(x), \quad (m \leq p). \quad (14)$$

In these equations, $a_k$ represent uncertain parameters that possess physical significance, and $J_k(x)$ and $F_k(x)$ are $n \times n$ and $n \times 1$ nonlinear matrices, respectively, that do not contain the uncertain parameters. Further, it is assumed that the structure of the nonlinear matrices $J_k(x)$ and $F_k(x)$ are known and that they possess the following properties.

(a) All the elements of each matrix are piecewise continuous nonlinear functions.

(b) All the elements of $J_k(x)$ are bounded for arbitrary value of x, and in particular, the upper and lower bounds of its element at the i-th row and the j-th column $J_k^{ij}(x)$ are known:

$$\text{For } \forall x, \max_{\substack{1 \leq k \leq m \\ 1 \leq i \leq n}} \{|J_k^{ij}(x)|\} \leq M_J. \quad (15)$$

(c) All the elements of $F_k(x)$ are bounded for bounded x.

In addition, it will be assumed that the range of existence of all of the uncertain parameters $a_k$ is estimatable:

$$\max_{1 \leq k \leq p} \{|a_k|\} \leq a_{max}.$$

Moreover, it will be assumed also that the states x, $\dot{x}$, and $x_M$ of the system Eq. (1) and Eq. (16) below are all measurable, and that the input U is bounded.

Next, the reference model section 54 possesses a reference model that can be represented by the following equation.

$$\begin{bmatrix} \dot{x}_{M1} \\ \dot{x}_{M2} \end{bmatrix} = \begin{bmatrix} O & I \\ k_1 I & k_2 I \end{bmatrix} \begin{bmatrix} x_{M1} \\ x_{M2} \end{bmatrix} + \begin{bmatrix} O \\ I \end{bmatrix} U, \quad (16)$$

where $x_M^T = (x_{M1}^T x_{M2}^T) = (x_{M11}, \ldots x_{M1n}, x_{M21}, \ldots, x_{M2n})$, U is a new vector input after the control system is constructed, and $k_1$ and $k_2$ are constants chosen so as to make the reference model stable. In this controller, the response of the real mechanical system 52 is arranged to become coincident with the response of the reference model 54.

The adaptor 62 computes the parameters $\hat{a}_k$ of the real mechanical system 52 given below by using the position signal $x_1$, the velocity signal $x_2$, and the acceleration signal $\dot{x}_2$ for each degree of freedom of the real mechanical system 52 that are detected by a position sensor 56, a velocity sensor 58, and an acceleration sensor 60, respectively, the position deviation signal and the velocity deviation signal for each degree of freedom between the reference model 54 and the real mechanical system 52 that are detected by the subtractors 61, and the nonlinear functions $Z_{jk}$.

$$\hat{a}_k = -\Gamma_k \int_0^t \sum_{j=1}^{n} Z_{jk} V_j d\tau + \hat{a}_k(0), \ (1 \leq k \leq p), \quad (17)$$

$$[\Gamma_k > 0, \ \max_{1 \leq k \leq p} \{|\hat{a}_k(0)|\} \leq a_{max}].$$

In the above equation, $Z_{jk}$ is the j-th row and k-th column element of matrix Z defined by Eq. (18) below, $V_j$ is the j-th row element of vector V defined by Eq. (19), and in Eq. (18) is given by Eq. (20):

$$-Z = [(J_1(x)\dot{x}_2 - F_1(x))/\lambda \ |---| \ (J_m(x)\dot{x}_2 - F_m(x))/\lambda | \ |-F_{m+1}(x)/\lambda \ |---| \ -F_p(x)/\lambda], \quad (18)$$

$$V = De, \quad (19)$$

$$\lambda \geq \epsilon + nmM_J \sqrt{\max M_\theta} \quad (20)$$

where $\epsilon$ is an appropriate positive number and $$\Gamma_{max} = \max_{1 \leq k \leq p} \{\Gamma_k\},$$

$$M_\theta = e(0)^T Pe(0) + \sum_{k=1}^{p} 4a_{max}^2/\Gamma_k.$$

in Eq. (19) and in the expression for $M_\theta$, the generalized state error $e(t)$ is defined by $e = x_M - x$. Further, matrices $A_M$ and B are $$A_M = \begin{bmatrix} O & I \\ k_1 I & k_2 I \end{bmatrix}, B = \begin{bmatrix} O \\ I \end{bmatrix}$$

that appear in Eq. (16). Moreover, matrix P is the positive definite symmetric solution of Lyapunov equation $$PA_M + A_M^T P = -Q,$$

and matrix D is defined by $$D = B^T P.$$

In the above, it should be noted that the matrix D is chosen to make the transfer function $W(s) = D(sI - A_M)^{-1}B$ to be strictly positive real. Hence, there holds $$\lim_{t \to \infty} x_M - x = 0$$

which shows the existence of $\lambda$ that assures the boundedness of all of the signals in the system, enabling the actual computation of the values to be determined.

The noninterference computation section 66 computes the input $u_D$ which cancels the interferential forces in the inertial term of the real mechanical system 52, as well as compensates for the variations in the value of the inertial term due to nonlinearity. Namely, the noninterference computation section 66 computes the input shown below by using the position signal $x_1$, the velocity signal $x_2$, and the acceleration signal $\dot{x}_2$ that are detected by the sensors 56, 58, and 60, respectively, the nonlinear functions $J_k(x)$, and the parameters $\hat{a}_k$ that are determined in the adaptor 62.

$$u_D = \sum_{k=1}^{m} \hat{a}_k J_k(x) \dot{x}_2, \quad (21)$$

The nonlinear force computation section 64 computes input $u_C$ which cancels nonlinear forces other than the inertial force in the real mechanical system 52. Namely, the nonlinear force computation section 64 computes a part of the compensating input $u_C$ given below by using the position signal $x_1$ and the velocity signal $\dot{x}_2$ that are detected by the sensors 56 and 58, respectively, the nonlinear functions $F_k(x)$, and the parameters $\hat{a}_k$ that are determined in the adaptor 62.

$$u_C = \sum_{k=1}^{p} \hat{a}_k F_k(x). \quad (22)$$

Then, the output $u_C$ of the nonlinear force computation section 64 and the output $u_D$ of the noninterference computation section 66 are introduced to a subtractor 70.

The stabilizer 69 computes the stabilizing input $u_S$ for the real mechanical system 52. Namely, the stabilizer 68 computes the input $u_C$ given below by using the position signal $x_1$, the velocity signal $x_2$, and the acceleration signal $\dot{x}_2$ that are detected by the sensor 56, 58, and 60, respectively, and the constants $k_1$ and $k_2$.

$$u_S = -\dot{x}_2 + k_1 x_1 + k_2 x_2. \quad (23)$$

Then, the output of the stabilizer 68 is multiplied by at the coefficient multiplier 69 and is introduced to an adder 72 together with the output of the subtractor 70. The output of the adder 72 is input along with the input U to the control system 50 to an adder 74, and the output of the adder 74 is introduced to the real mechanical system 52 as an input u.

In summary, in the controller for a multidegree of freedom nonlinear mechanical system in accordance with the present invention, the position and velocity of the real mechanical system tend to coincide with the position and velocity of the reference model, so that it is possible to achieve the effects mentioned earlier.

Moreover, in the second embodiment there is obtained an added advantage that the construction of the control circuit can be simplified.

Various modifications will become possible for those skilled in the art after receiving the teachings of the present disclosure without departing from the scope thereof.

What is claimed is:

1. A controller for a multidegree of freedom nonlinear mechanical system which carries out adaptive model following control for a nonlinear mechanical system with multiple degrees of freedom that can be described by a q-th degree differential equation and with driving sources for each of its degree of freedom, comprising:

(a) a model section having a built-in reference model that has predetermined response characteristics;
  (b) a first synthesizing means for obtaining the difference of the internal states between the mechanical system and the reference model;

(c) means for detecting signals for the position and i-th derivative ($1 \leq i \leq q$) of the mechanical system;

(d) an adaptor for determining the time-varying parameters of the mechanical system, in accordance with the difference in the internal states between the mechanical system and the reference model obtained from said synthesizing means, an input applied to a control system, the signals for the position and i-th derivative ($1 \leq i \leq q$) of the mechanical system, and a nonlinear structure of the mechanical system;

(e) computing means for computing a compensating input to cancel the nonlinear forces in the mechanical system and the interferential forces between the degrees of freedom of the mechanical system, in accordance with the determined parameter signals obtained from said adaptor, the signals for the position and i-th derivative ($1 \leq i \leq q$) of the mechanical system, and the nonlinear structure of the mechanical system; and (f) a second synthesizing means for synthesizing the compensating input from said computing means and the input that is applied to the control system in order that the output of the mechanical system corresponds to the output of the reference model in the course of time.

2. A controller for multidegree of freedom nonlinear mechanical system as claimed in claim 1, in which said computing means comprises:

a nonlinear force computation section for computing a compensating input to cancel nonlinear forces other than the inertial force in the mechanical system, in accordance with the determined parameter signals from said adaptor, the signals for the position and i-th derivative ($1 \leq i \leq q$) of the mechanical system, and the nonlinearity of the mechanical system;

a noninterference computation section for computing a compensating input to cancel interferential forces between the degrees of freedom of the mechanical system that are contained in the inertial term, in accordance with the determined parameter signals from said adaptor, the signals for the position and i-th derivative ($1 \leq i \leq q$), and the nonlinearity of the mechanical system; and an inertial term gain computation section for computing nonlinear compensating gain for the inertial term, in accordance with the determined parameter signals from said adaptor, signals for the position and i-th derivative ($1 \leq i \leq q$) of the mechanical system, and the nonlinearity of the mechanical system.

3. A controller for multidegree of freedom nonlinear mechanical system as claimed in claim 2, in which said first synthesizing means comprises a first subtractor which outputs a position deviation signal and a velocity deviation signal for each degree of freedom, by subtractively synthesizing a position signal and a velocity signal of a real mechanical system and a position signal and a velocity signal of said reference model.

4. A controller for multidegree of freedom nonlinear mechanical system as claimed in claim 3, in which said second synthesizing means comprises a second subtractor for subtractively synthesizing the output from said nonlinear force computation section and the output from said noninterference computation section, and a first adder for additively synthesizing the output from the second subtractor and the output from said inertial term gain computation section for outputting the result to the nonlinear real mechanical system.

5. A controller for multidegree of freedom nonlinear mechanical system as claimed in claim 4, further comprising:

a stabilizer for computing a stabilizing input $u_{Si}$ from the position and i-th derivative ($1 \leq i \leq q$) of the mechanical system, an output $u_{Si}$ of said stabilizer is added to the input U to the control system by means of a second adder.

6. A controller for multidegree of freedom nonlinear mechanical system as claimed in claim 5, in which the real mechanical system is described by the following equation of motion, $$\begin{bmatrix} I & O \\ O & J(x) \end{bmatrix} \begin{bmatrix} \dot{x}_1 \\ \dot{x}_2 \end{bmatrix} = \begin{bmatrix} x_2 \\ F(x) + u \end{bmatrix},$$

where $x^T \triangleq (x_1^T, x_2^T) = (x_{11}, \ldots, x_{1n}, x_{21}, \ldots, x_{2n})$, $x_1$: position of the system, $x_2$: velocity of the system, $$J(x) = \begin{bmatrix} \sum_{k=0}^{m_{11}} a_k^{11} J_k^{11}(x), \ldots, \sum_{k=0}^{m_{1n}} a_k^{1n} J_k^{1n}(x) \\ \vdots & \vdots \\ \sum_{k=0}^{m_{n1}} a_k^{n1} J_k^{n1}(x), \ldots, \sum_{k=0}^{m_{nn}} a_k^{nn} J_k^{nn}(x) \end{bmatrix},$$

$$F(x) = \begin{bmatrix} \sum_{K=1}^{P_1} b_k^1 F_k^1(x) \\ \vdots \\ \sum_{k=1}^{P_n} b_k^n F_k^n(x) \end{bmatrix},$$

$a_0^{ij}, \ldots, a_{mij}^{ij}; b_1^i, \ldots, b_{pi}^i, (1 \leq i, j \leq n)$: unknown parameters or time-varying parameters, $J_0^{ij}(x), \ldots, J_{mij}^{ij}(x); F_1^i(x), \ldots, F_{Pi}^i(x), (1 \leq i, j \leq n)$: nonlinear bounded known functions that do not contain unknown parameters, u: nx1 input vector applied to the nonlinear real mechanical system, O: nxn zero matrix, I: nxn unit matrix, $a_0^{ii} J_0^{ii}(x) \neq 0$, and $a_0^{ii} > 0$.

7. A controller for multidegree of freedom nonlinear mechanical system as claimed in claim 6, in which said reference model section includes a reference model which is represented by the following equation:

$$\begin{bmatrix} \dot{x}_{M1} \\ \dot{x}_{M1} \end{bmatrix} = \begin{bmatrix} O & I \\ K_1 & K_2 \end{bmatrix} \begin{bmatrix} x_{M1} \\ x_{M2} \end{bmatrix} + \begin{bmatrix} O \\ I \end{bmatrix} U,$$

where $x_M^T = (x_{M1}^T x_{M2}^T) = (x_{M11}, \ldots, x_{M1n}, x_{M21}, \ldots, x_{M2n})$, U: new vector input after construction of the control system, $K_1$: diag $[k_{11}, \ldots, k_{1n}]$, and
$K_2$: diag $[k_{21}, \ldots, k_{2n}]$.

8. A controller for multidegree of freedom nonlinear mechanical system as claimed in claim 7, in which said adaptor computes the following quantities by using the position signal $x_1$, the velocity signal $x_2$, and the acceleration signal $\dot{x}_2$ for each degree of freedom of the real mechanical system detected by the position sensor, the velocity sensor, and the acceleration sensor, respectively, the position deviation signal, the velocity deviation signal between the reference model and the real mechanical system detected by the subtractor, the nonlinear functions $J_0^{ij}(x), \ldots, J_{m_{ij}}^{ij}(x); F_1^i(x), \ldots, F_{P_i}^i(x)$, ($1 \leq i, J \leq n$), the vectors $x_1$ and $x_2$, and the input U, $$\hat{a}_o^{ii} = C_o^{ii} \int_0^t V_i(\tau) [k_{1i}x_{1i} + K_{2i}x_{2i} + U_i] \, d\tau + \hat{a}_o^{ii}(0),$$

$(1 \leq i \leq n),$ $$\hat{a}_k^{ij} = -C_k^{ij} \int_0^t [V_i(\tau)J_k^{ij}(x)\dot{x}_{2j}/J_o^{ii}(x)] \, d\tau + \hat{a}_k^{ij}(0),$$

$$\begin{Bmatrix} j \neq i, \; 0 \leq k \leq m_{ij} \\ j = i, \; 1 \leq k \leq m_{ij} \end{Bmatrix},$$

$$\hat{b}_k^i = C_k^i \int_0^t [V_i(\tau)F_k^i(x)/J_0^{ii}(x)] d\tau + \hat{b}_k^i(0), \; (1 \leq i \leq n),$$

where
$V_1 = d_i^T(x_{M1i} - X_{1i}, x_{M2i} - X_{2i})^T$, $(1 \leq i \leq n)$,
$\hat{a}_o^{ii}(0)$, $\hat{a}_{ii}^{ii}(0)$, $\hat{b}_k^i(0)$: arbitrary
$d_i$: $2 \times 1$ vector that is chosen to make the transfer function $W_i(s) = d_i^T(sI - A_{Mi})^{-1}b_i$ to be strictly positive real, $$A_{Mi} = \begin{bmatrix} 0 & 1 \\ k_{1i} & k_{2i} \end{bmatrix},$$

$$I = \begin{bmatrix} 1 & 0 \\ 0 & 1 \end{bmatrix},$$

$$b_i = \begin{bmatrix} 0 \\ 1 \end{bmatrix}, \text{ and}$$

$C_k^{ii} > 0$ and $C_k^i > 0$.

9. A controller for multidegree of freedom nonlinear mechanical system as claimed in claim 8, in which the noninterference compentation section computes an output $u_{Di}$ given below by using the position signal $x_1$, the velocity signal $x_2$, and the acceleration signal $\dot{x}_2$ that are detected by the sensors, the nonlinear functions $J_k^{ij}(x)$ (excluding $J_o^{ii}(x)$) and the parameters $\hat{a}_k^{ij}$ (excluding $\hat{a}_o^{ii}$) that are determined by the adaptor, $$u_{Di} = \sum_{j=1}^{n} \left[ \sum_{k=\delta_{ij}}^{m_{ij}} \hat{a}_k^{ij} J_k^{ij}(x) \right] \dot{x}_{2j}, \; (1 \leq i \leq n),$$

where $\delta_{ij} = \begin{cases} 1 \text{ if } i = j \\ 0 \text{ if } i \neq j \end{cases}$ 10. A controller for multidegree of freedom nonlinear mechanical system as claimed in claim 9, in which the nonlinear force computation section computes a part $u_{Ci}$ of the compensating input given below by using the position signal $x_1$ and the velocity signal $x_2$ that are detected by the sensors, the nonlinear functions $F_k^i(x)$, and the parameters $b_k^i$ that are determined by the adaptor, $$U_{Ci} = -\sum_{k=1}^{P_i} \hat{b}_k^i F_k^i(x), \; (1 \leq i \leq n).$$

11. A controller for multidegree of freedom nonlinear mechanical system as claimed in claim 10, in which the inertial term gain computation section computes a gain $G_i$ given below by using the position signal $x_1$ and the velocity signal $x_2$ that are detected by the sensors, the nonlinear functions $J_0^{ii}(x)$, and the parameters $\hat{a}^{ii}$ that are determined by the adaptor, $$G_i = \hat{a}_o^{ii} J_o^{ii}(x), \; (1 \leq i \leq n).$$

12. A controller for multidegree of freedom nonlinear mechanical system as claimed in claim 11, in which said stabilizer computes an input $u^{Si}$ given below by using the position signal $x_1$ and the velocity signal $x_2$ that are detected by the sensors, and the constants $k_1$ and $k_2$, $$u_{Si} = k_{1i}x_{1i} + k_{2i}x_{2i}, \; (1 \leq i \leq n).$$

13. A controller for multidegree of freedom nonlinear mechanical system as claimed in claim 2, in which said detecting means comprises a position sensor, a velocity sensor, and an acceleration sensor for detecting the position, the velocity, and the acceleration, respectively, of the mechanical system.

14. A controller for multidegree of freedom nonlinear mechanical system as claimed in claim 1, in which said computing means comprises:
a nonlinear force computing section for computing a compensating input to cancel nonlinear forces other than the inertial force in the mechanical system, in accordance with the determined parameter signals from said adaptor, the values of the position and i-th derivative ($1 \leq i \leq q$) of the mechanical system, and the nonlinear structure of the mechanical system; and
a noninterference computation section for computing a compensating input to cancel the interferential forces between the degrees of freedom of the mechanical system that are contained in the inertial force, as well as to compensating for the variations in the value of the inertial term due to nonlinearity, in accordance with the signals from said adaptor, the values of the position and the i-th derivative ($1 \leq i \leq q$) of the mechanical system, and the nonlinear structure of the mechanical system.

15. A controller for multidegree of freedom nonlinear mechanical system as claimed in claim 14, in which said first synthesizing means comprises a first subtractor for outputting a position deviation signal and a velocity deviation signal for each degree of freedom by subtractively synthesizing a position signal and a velocity signal of the real mechanical system and a position signal and a velocity signal from said reference model.

16. A controller for multidegree of freedom nonlinear mechanical system as claimed in claim 15, in which said second synthesizing means comprises a second subtractor for subtractively synthesizing the output from said nonlinear force computation section and the output from said noninterference computation section, and a first adder for additively synthesizing the output from the second subtractor and the input to the control system to output the result to the nonlinear real mechanical system.

17. A controller for multidegree of freedom nonlinear mechanical system as claimed in claim 16, further comprising:
a stabilizer for computing a stabilizing input $u_{Si}$ from the velues of the position and its i-th derivative ($1 \leq i \leq q$) of the mechanical system, the output $u_{Si}$ of the stabilizer is added to the output from the second subtractor by means of a second adder.

18. A controller for multidegree of freedom nonlinear mechanical system as claimed in claim 17, in which the real mechanical system is described by the following equation of motion:

$$\begin{bmatrix} I & O \\ O & J(x) \end{bmatrix} \begin{bmatrix} \dot{x}_1 \\ \dot{x}_2 \end{bmatrix} = \begin{bmatrix} x_2 \\ F(x) + u \end{bmatrix},$$

where
$X^T = (X_1^T, X_2^T) = (X_{11}, \ldots, X_{1n}, X_{21}, \ldots, X_{2n})$,
$X_1$: position of the system,
$X_2$: velocity of the system, $$J(x) = \sum_{k=1}^{m} a_k J_k(x),$$

$$F(x) = \sum_{k=1}^{P} a_k F_R(x), \quad (m \leq P),$$

$$\max_{1 \leq k \leq P} \{|a_k|\} \leq a_{max}, \text{ and}$$

$$\text{For } \forall x, \max_{\substack{1 \leq k \leq m \\ 1 \leq i \leq n}} \{|J_k^{ij}(x)|\} \leq MJ.$$

19. A controller for multidegree of freedom nonlinear mechanical system as claimed in claim 18, in which said reference model section includes a reference model that is represented by the following equation:

$$\begin{bmatrix} \dot{x}_{M1} \\ \dot{x}_{M2} \end{bmatrix} = \begin{bmatrix} O & I \\ k_1 I & k_2 I \end{bmatrix} \begin{bmatrix} x_{M1} \\ x_{M2} \end{bmatrix} + \begin{bmatrix} O \\ I \end{bmatrix} U,$$

where
$x_M^T = (x_{M1}^T x_{M2}^T) = (x_{M11}, \ldots x_{M1n}, x_{M21}, \ldots, x_{M2n})$, and
U: new vector input after construction of the control system.

20. A controller for multidegree of freedom nonlinear mechanical system as claimed in claim 19, in which said adaptor carries out the following computation by using the position signal $x_1$, the velocity signal $x_2$, and the acceleration signal $\dot{x}_2$ for each degree of freedom of the real mechanical system that are detected by the position sensor, the velocity sensor, and the acceleration sensor, respectively, the position deviation signal and the velocity deviation signal for each degree of freedom between the reference model and the real mechanical system that are detected by the subtractors, and the nonlinear functions:

$$\hat{a}_k = -\Gamma_k \int_0^t \sum_{j=1}^{n} Z_{jk} V_j d\tau + \hat{a}_k(0),$$

$$\left[ \Gamma_k > 0, \max_{1 \leq k \leq P} \{|\hat{a}_k(0)|\} \leq a_{max} \right],$$

where $-Z = [(J_1(x)\dot{x}_2 - F_1(x))/\lambda \mid \cdots \mid (J_m(x)x_2 - F_m(x))/\lambda \mid -F_{m+1}(x)/\lambda \mid \cdots \mid -F_P(x)/\lambda]$, $V = De$, $\lambda \geq \epsilon + nmM_J \sqrt{\Gamma_{max} M_\theta}$ ($\epsilon$: appropriate positive number)

$$\Gamma_{max} = \max_{1 \leq k \leq P} \{\Gamma_k\},$$

$$M_\theta = e(0)^T P e(0) + \sum_{k=1}^{P} 4 a^2_{max}/\Gamma_k,$$

$e = x_M - x$, the matrix P being the positive definite symmetric solution of Lyapunov equation, $$PA_M + A_M^T P = -Q,$$

with $$A_M = \begin{bmatrix} O & I \\ K_1 I & k_2 I \end{bmatrix}, B = \begin{bmatrix} O \\ I \end{bmatrix},$$

and $$D = B^T P$$

where D is chosen to make the transfer function $W(s) = D(sI - A_M)^{-1} B$ to be strictly positive real.

21. A controller for multidegree of freedom nonlinear mechanical system as claimed in claim 20, in which said noninterference computation section computes an output $u_D$ given below by using the position signal $x_1$, the velocity signal $x_2$, and the acceleration signal $\dot{x}_2$ that are detected by said sensors, said nonlinear functions $J_k(x)$, and the parameters $\hat{a}_k$ that are determined by the adaptor, $$U_D = \sum_{k=1}^{m} a_k J_k(x) \dot{x}_2.$$

22. A controller for multidegree of freedom nonlinear mechanical system as claimed in claim 21, in which said nonlinear force computation section computes a part $u_C$ of the compensating input given below by using the position signal $x_1$ and the velocity signal $x_2$ that are detected by said sensors, said nonlinear functions $F_k(x)$, and the parameters $a_k$ that are determined by the adaptor, $$u_C = \sum_{k=1}^{P} a_k F_k(x).$$

23. A controller for multidegree of freedom nonlinear mechanical system as claimed in claim 22, in which said stabilizer computes an input $u_S$ given below by using the position signal $x_1$ and the velocity signal $x_2$ and the acceleration signal $\dot{x}_2$ that are detected by said sensors and the constants $k_1$ and $k_2$, $$u_S = -\dot{x}_2 + k_1 x_1 + k_2 x_2.$$

24. A controller for multidegree of freedom nonlinear mechanical system as claimed in claim 14, in which said detecting means comprises a position sensor, a velocity sensor, and an acceleration sensor for detecting the position, the velocity, and the acceleration, respectively, of the mechanical system.

* * * * *